United States Patent
Kobayashi et al.

(10) Patent No.: US 10,907,662 B2
(45) Date of Patent: Feb. 2, 2021

(54) BONDED BODY, FLUID PRESSURE CYLINDER, AND MANUFACTURING METHOD OF BONDED BODY

(71) Applicant: KYB-YS CO., LTD., Nagano (JP)

(72) Inventors: Nobuyuki Kobayashi, Nagano (JP); Yasuyuki Nagai, Nagano (JP); Shinji Satou, Nagano (JP)

(73) Assignee: KYB-YS CO., LTD., Nagano (JP)

(*) Notice: Subject to any disclaimer, the term of this patent is extended or adjusted under 35 U.S.C. 154(b) by 52 days.

(21) Appl. No.: 15/765,583

(22) PCT Filed: Sep. 21, 2016

(86) PCT No.: PCT/JP2016/077845
§ 371 (c)(1),
(2) Date: Apr. 3, 2018

(87) PCT Pub. No.: WO2017/061276
PCT Pub. Date: Apr. 13, 2017

(65) Prior Publication Data
US 2018/0291934 A1 Oct. 11, 2018

(30) Foreign Application Priority Data
Oct. 5, 2015 (JP) ................................. 2015-197869

(51) Int. Cl.
*F15B 15/14* (2006.01)

(52) U.S. Cl.
CPC ............................... *F15B 15/1438* (2013.01)

(58) Field of Classification Search
CPC ............................ F15B 15/1438; B23K 20/12
See application file for complete search history.

(56) References Cited

U.S. PATENT DOCUMENTS

| | | | | |
|---|---|---|---|---|
| 2,784,758 A | * | 3/1957 | Rohe | F16B 37/061 411/171 |
| 4,187,766 A | * | 2/1980 | Gaylord | F15B 15/1438 220/612 |
| 4,832,769 A | * | 5/1989 | Shantz | B23K 20/129 156/294 |
| 6,637,315 B2 | * | 10/2003 | Mickelson | F15B 15/1438 92/164 |

(Continued)

FOREIGN PATENT DOCUMENTS

| | | |
|---|---|---|
| FR | 2544806 A1 | 10/1984 |
| JP | S44-3462 B1 | 2/1969 |
| JP | 2007-229719 A | 9/2007 |

(Continued)

*Primary Examiner* — F Daniel Lopez
(74) *Attorney, Agent, or Firm* — Rabin & Berdo, P.C.

(57) ABSTRACT

A bonded body formed by frictional pressure-contact, includes: a first member including an end surface and a hollow portion with an opening in the end surface; and a second member including a body portion bonded to the end surface and a protrusion portion protruding from the body portion, the protrusion portion being accommodated in the hollow portion, wherein at least one of an inner peripheral surface of the hollow portion and an outer peripheral surface of the protrusion portion includes an inclined portion inclined to a radial direction of the opening, while the other is in contact with the inclined portion.

1 Claim, 9 Drawing Sheets

(56) References Cited

U.S. PATENT DOCUMENTS 7,219,933 B2 * 5/2007 Sakamoto .............. B21D 19/02
285/288.1

FOREIGN PATENT DOCUMENTS

| JP | 2009121282 A | 6/2009 |
| JP | 2014155991 A | 8/2014 |
| RU | 2366552 C2 | 9/2009 |
| WO | 0192696 A2 | 12/2001 |

* cited by examiner

BONDED BODY, FLUID PRESSURE CYLINDER, AND MANUFACTURING METHOD OF BONDED BODY

TECHNICAL FIELD

The present invention relates to a bonded body, a fluid pressure cylinder including this bonded body, and a manufacturing method of this bonded body.

BACKGROUND ART

JP2007-229719A discloses a method of bonding a cover body to an end portion of a tubular body by frictional pressure-contact and of sealing the end portion of the tubular body. The cover body used in this method is provided with an annular projection that abuts against the end surface of the tubular body, a boss portion formed on an inner side of the annular projection, and a flange portion formed at a distal end of the boss portion.

In the method disclosed in JP2007-229719A, first, the flange portion and the boss portion are inserted into the tubular body, and the annular projection is made to abut against the end surface of the tubular body. By relatively rotating the tubular body and the cover body in this state, a friction heat is generated on abutting surfaces of the both, whereby the end portion of the tubular body and the annular projection of the cover body are heated. After that, a pressing force in an axial direction is applied to the cover body and the tubular body, and the cover body is bonded to the tubular body.

SUMMARY OF INVENTION

However, in the cover body disclosed in JP2007-229719A, outer diameters of the boss portion and the flange portion are smaller than an inner diameter of a tubular body, and a gap is formed between outer peripheral surfaces of the boss portion and the flange portion and an inner peripheral surface of the tubular body. Thus, when the pressing force in the axial direction is applied to the cover body and the tubular body, the cover body can be easily shifted in a radial direction with respect to the tubular body.

The present invention has an object to prevent a shift between a first member and a second member during bonding.

The present invention relates to a bonded body formed by frictional pressure-contact. According to one aspect of the present invention, the bonded body includes a first member including an end surface and a hollow portion with an opening in the end surface, and a second member including a body portion bonded to the end surface and a protrusion portion protruding from the body portion, the protrusion portion being accommodated in the hollow portion, wherein at least one of an inner peripheral surface of the hollow portion and an outer peripheral surface of the protrusion portion includes an inclined portion inclined to a radial direction of the opening, while the other is in contact with the inclined portion.

Moreover, the present invention relates to a manufacturing method of a bonded body formed by bonding a first member and a second member by frictional pressure-contact, the first member having a hollow portion with an opening in an end surface, the second member having a protrusion portion protruding from a body portion. According to one aspect of the present invention, the manufacturing method includes inserting the protrusion portion into the hollow portion and causing the body portion of the second member to abut against the end surface of the first member, relatively rotating the first member and the second member to generate heat on the end surface and the body portion, and pressing the first member and the second member to each other until an inclined portion formed on at least one of an inner peripheral surface of the hollow portion and an outer peripheral surface of the protrusion portion is brought into contact with the other, the inclined portion being inclined to a radial direction of the opening.

DESCRIPTION OF EMBODIMENTS

Embodiments of the present invention will be described below by referring to the attached drawings. Here, a hydraulic cylinder 100 in which a working oil is used as a working fluid will be described, but other fluids such as working water and the like may be used as the working fluid.

The hydraulic cylinder 100 is used as an actuator mounted on a machine such as a construction machine and an industrial machine. The hydraulic cylinder 100 is used as an arm cylinder mounted on a hydraulic excavator, for example.

First, a structure of the hydraulic cylinder 100 will be described by referring to FIGS. 1 and 2.

Figure 1:
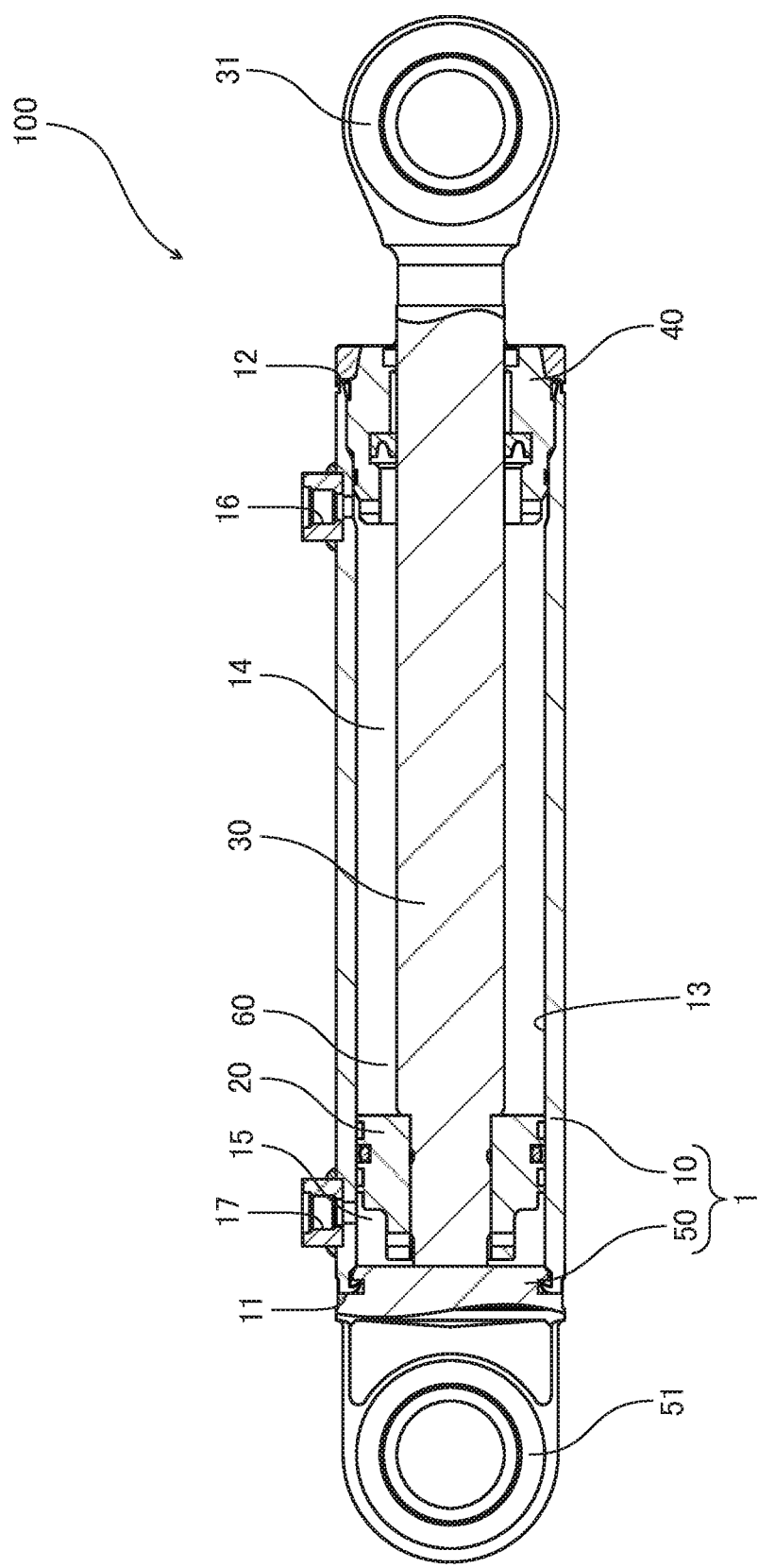
FIG. 1 is a partial sectional view of a hydraulic cylinder according to an embodiment of the present invention.

As shown in FIG. 1, the hydraulic cylinder 100 includes a bonded body 1 formed by bonding a cylinder tube (first member) 10 and a cylinder bottom (second member) 50 to each other by frictional pressure-contact. The cylinder tube 10 has a hollow portion 13 opened in both end surfaces 11 and 12, and one end surface 11 is closed by the cylinder bottom 50.

Moreover, the hydraulic cylinder 100 includes a piston 20 slidably accommodated in the hollow portion 13 of the cylinder tube 10 and a piston rod 30 inserted into the cylinder tube 10, capable of moving in/out. One end of the piston rod 30 is connected to the piston 20, while the other end of the piston rod 30 is extended from the cylinder tube 10 through the opening in the other end surface 12 of the cylinder tube 10.

The opening in the other end surface 12 of the cylinder tube 10 is closed by the cylinder head 40. The cylinder head 40 is formed annularly and slidably supports the piston rod 30.

The hydraulic cylinder 100 is mounted on a machine such as a construction machine and an industrial machine by using a connecting portion 31 provided on the other end of the piston rod 30 and a connecting portion 51 provided on the cylinder bottom 50.

The piston 20 divides an inside of the cylinder tube 10 into a rod side chamber 14 and an anti-rod side chamber 15. Specifically, the rod side chamber 14 is defined by the cylinder tube 10, the piston 20, and the cylinder head 40, while the anti-rod side chamber 15 is defined by the cylinder tube 10, the piston 20, and the cylinder bottom 50.

The cylinder tube 10 is provided with a head-side port 16 that communicates with the rod side chamber 14 and a bottom-side port 17 that communicates with the anti-rod side chamber 15.

The head-side port 16 and the bottom-side port 17 are selectively connected to a hydraulic pump (not shown) or a tank (not shown) through a switching valve (not shown). When one of the head-side port 16 and the bottom-side port 17 is made to communicate with the hydraulic pump by the switching valve, the other is made to communicate with the tank.

When the working oil from the hydraulic pump is supplied to the rod side chamber 14 through the head-side port 16, the piston 20 and the piston rod 30 move to a direction of contracting the anti-rod side chamber 15, and the hydraulic cylinder 100 is contracted. At this time, the working oil in the anti-rod side chamber 15 is discharged through the bottom-side port 17.

When the working oil from the hydraulic pump is supplied to the anti-rod side chamber 15 through the bottom-side port 17, the piston 20 and the piston rod 30 are moved to a direction of contracting the rod-side chamber 14, and the hydraulic cylinder 100 is extended. At this time, the working oil in the rod side chamber 14 is discharged through the head-side port 16.

Figure 2:
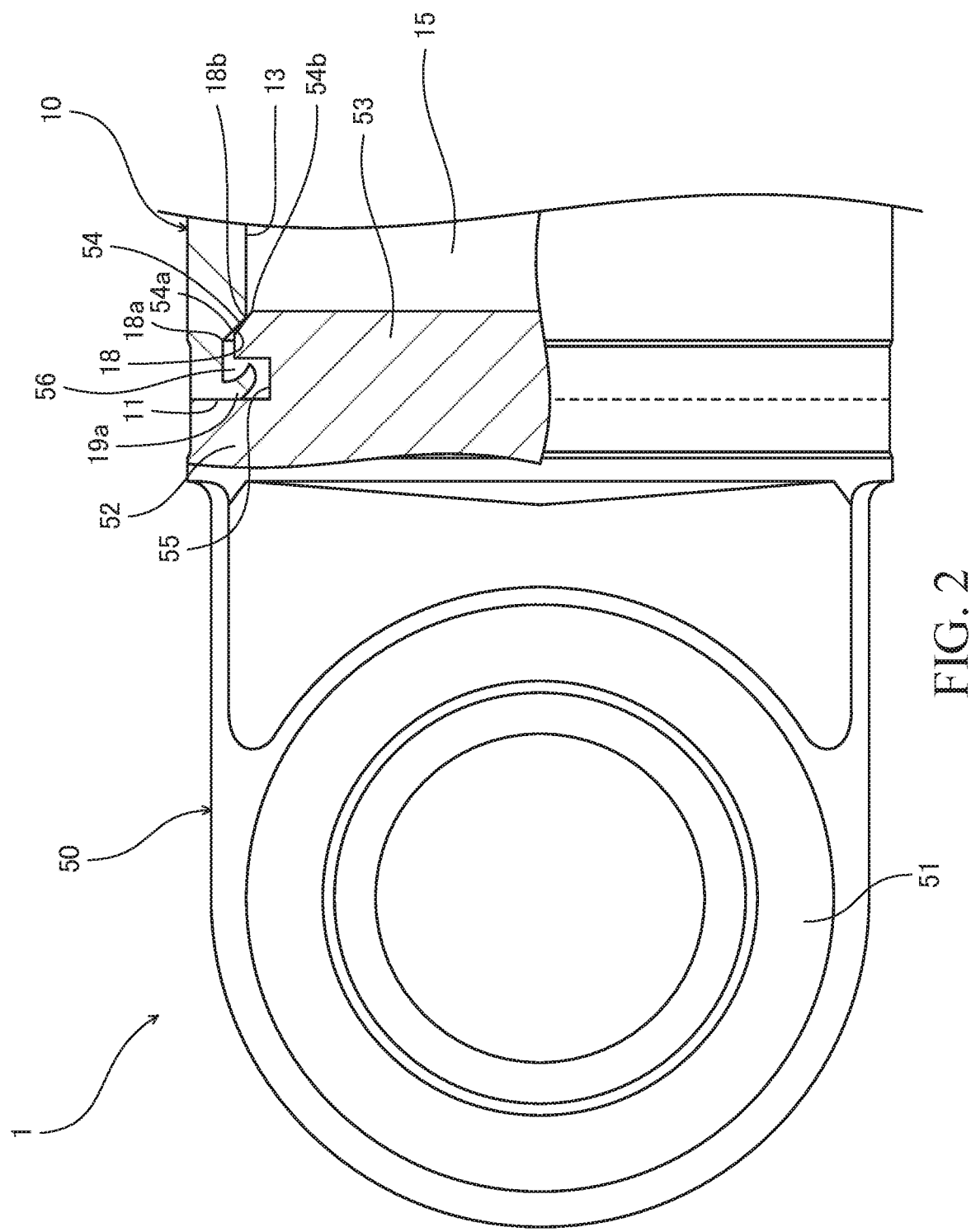
FIG. 2 is a partial sectional view of a periphery of a cylinder bottom.

FIG. 2 is a partial sectional view of a periphery of the cylinder bottom 50. As shown in FIG. 2, an annular inclined portion 18 is formed on an inner peripheral surface of the hollow portion 13. The inclined portion 18 is inclined to the radial direction (the radial direction of the cylinder tube 10) of an opening of the hollow portion 13 so that an edge 18a on an outer side in the radial direction of the inclined portion 18 is located closer to the end surface 11 side than an edge 18b on an inner side in the radial direction. The inclined portion 18 may be formed having a tapered state (planar state) or may be formed having a curved shape.

Moreover, an inner burr 19a is formed on the cylinder tube 10 to protrude toward the inner side in the radial direction from an opening edge of the end surface 11. When the cylinder tube 10 and the cylinder bottom 50 are bonded by frictional pressure-contact, the inner burr 19a is formed by fluidity of a base metal of the cylinder tube 10.

The cylinder bottom 50 has a body portion 52 bonded to the end surface 11 of the cylinder tube 10 and a protrusion portion 53 that protrudes from the body portion 52. The protrusion portion 53 is accommodated in the hollow portion 13 of the cylinder tube 10.

An annular chamfered portion 54 as the inclined portion is formed on a distal end of an outer peripheral surface of the protrusion portion 53. The chamfered portion 54 is inclined to the radial direction of the opening of the hollow portion 13 (the radial direction of the cylinder tube 10) so that an edge 54a on the outer side in the radial direction of the chambered portion 54 is located closer to the body portion 52 side than an edge 54b on the inner side in the radial direction. The chamfered portion 54 may be formed having a tapered state (planar state) or may be formed having a curved shape.

The inclined portion 18 of the cylinder tube 10 and the chamfered portion 54 of the cylinder bottom 50 are in contact with each other over the entire circumference. That is, a boundary of the anti-rod side chamber 15 is defined by a contact portion formed by contact between the inclined portion 18 and the chamfered portion 54 with each other.

Since the inclined portion 18 and the chamfered portion 54 are inclined, when the cylinder tube 10 and the cylinder bottom 50 are bonded, the cylinder bottom 50 is guided to a desired position in the radial direction with respect to the cylinder tube 10 by the contact between the inclined portion 18 and the chamfered portion 54. Therefore, a shift between the cylinder tube 10 and the cylinder bottom 50 during bonding can be prevented.

A dent 55 is formed on the outer peripheral surface of the protrusion portion 53. The dent 55 is located between the body portion 52 and the chamfered portion 54. More specifically, the dent 55 is formed so that its side surface continues from the end surface of the body portion 52 without a step. Thus, the end portion of the cylinder tube 10, which is pressed by the end surface of the body portion 52 in frictional pressure-contact and plastically fluidized, is guided as the inner burr 19a into the dent 55. Therefore, the inner burr 19a can be prevented from being sandwiched between the inclined portion 18 and the chamfered portion 54 during bonding, and the shift between the cylinder tube 10 and the cylinder bottom 50 can be prevented more reliably.

An annular gap 56 is formed between the inner peripheral surface of the hollow portion 13 and the outer peripheral surface of the protrusion portion 53. Since the inclined portion 18 and the chamfered portion 54 are in contact with each other over the entire circumference, the gap 56 is formed as a sealed space. Therefore, a foreign substance in the gap 56 (oxidized scale generated on the surface of the inner burr 19a in frictional pressure-contact, for example) can be prevented from flowing out to the anti-rod side chamber 15.

Subsequently, a manufacturing method of the hydraulic cylinder 100 will be described by referring to FIGS. 3 to 6. Here, the manufacturing method of the bonded body 1 formed by bonding the cylinder tube 10 and the cylinder bottom 50 will be mainly described.

Figure 3:
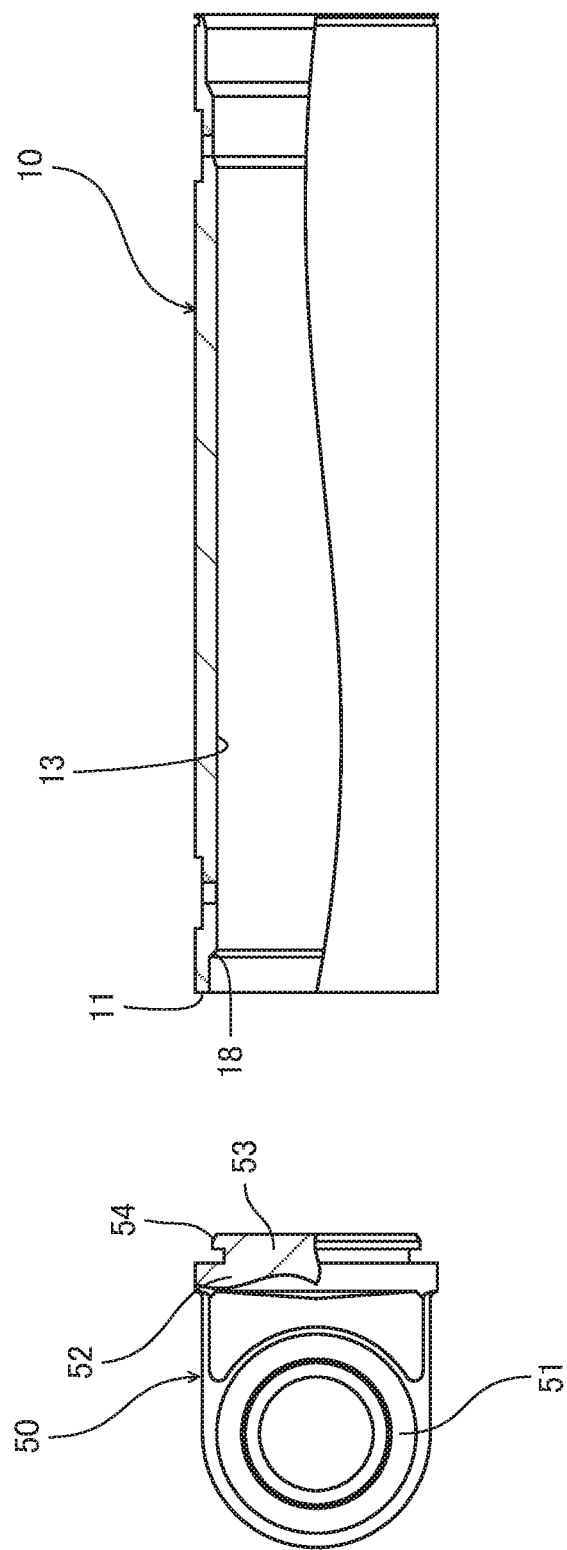
FIG. 3 is a partial sectional view of a cylinder tube and a cylinder bottom before bonding.
Figure 4:
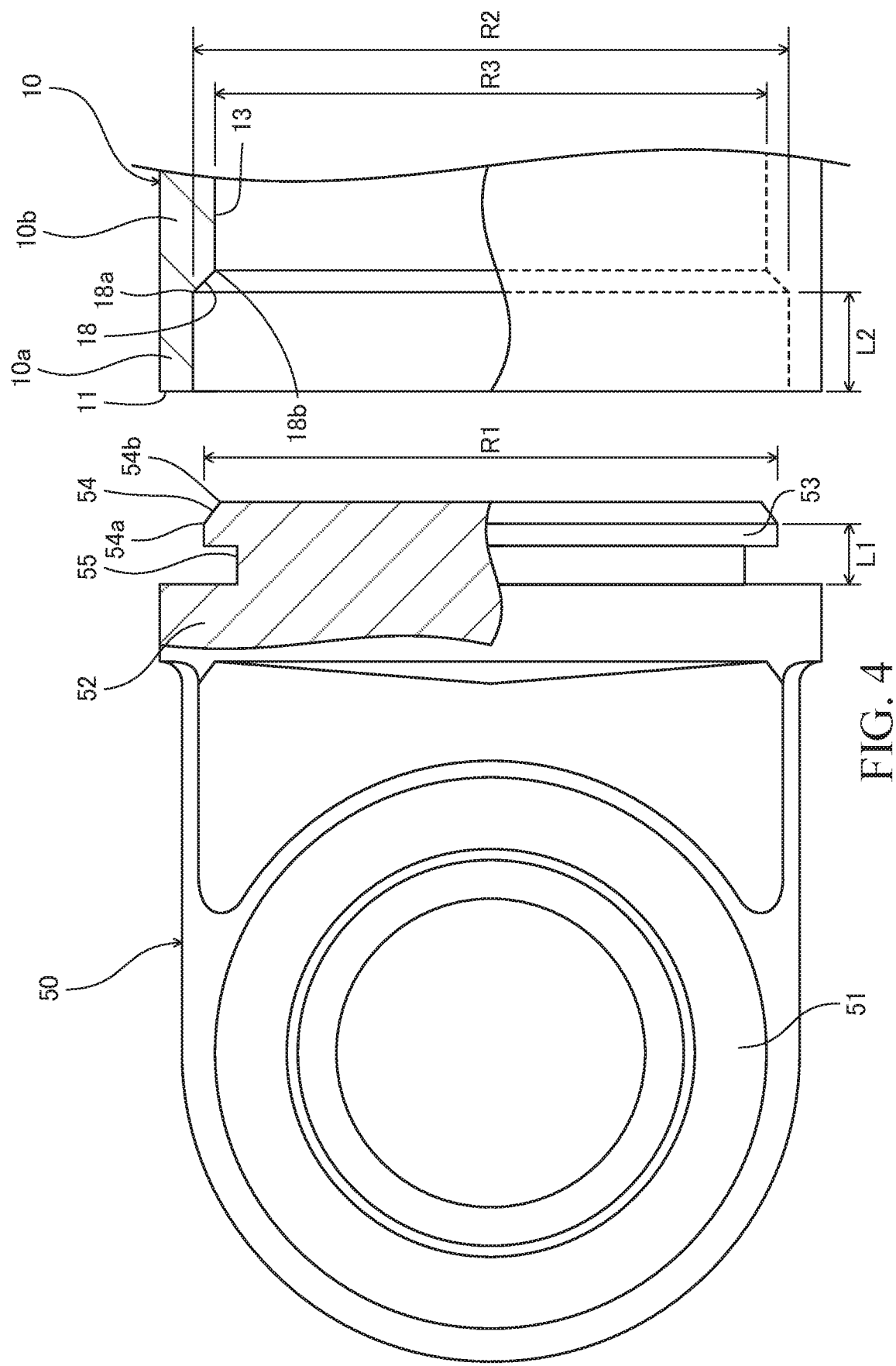
FIG. 4 is a partial sectional view of the cylinder tube and the cylinder bottom before bonding and shows a periphery of one of end surfaces of the cylinder tube in an enlarged manner.

FIG. 3 is a partial sectional view of the cylinder tube 10 and the cylinder bottom 50 before bonding, and FIG. 4 shows a periphery of one of the end surfaces of the cylinder tube shown in FIG. 3 in an enlarged manner.

As shown in FIGS. 3 and 4, the base metal of the cylinder tube 10 has a cylindrical large-diameter portion 10a having the end surface 11 and a cylindrical small-diameter portion 10b having an inner diameter smaller than the inner diameter of the large-diameter portion 10a. The small-diameter portion 10b is provided continuously to the large-diameter portion 10a, and the inclined portion 18 is formed between the large-diameter portion 10a and the small-diameter portion 10b.

On the outer peripheral surface of the protrusion portion 53 on the cylinder bottom 50, the chamfered portion 54 and the dent 55 are formed in advance. An outer diameter R1 of the protrusion portion 53 is smaller than an inner diameter R2 of the large-diameter portion 10*a* and larger than the inner diameter of the small-diameter portion 10*b*. Moreover, a dimension L1 from the body portion 52 to the chamfered portion 54 in the protrusion portion 53 is smaller than a dimension L2 from the end surface 11 to the inclined portion 18 in the large-diameter portion 10*a*.

Figure 5:
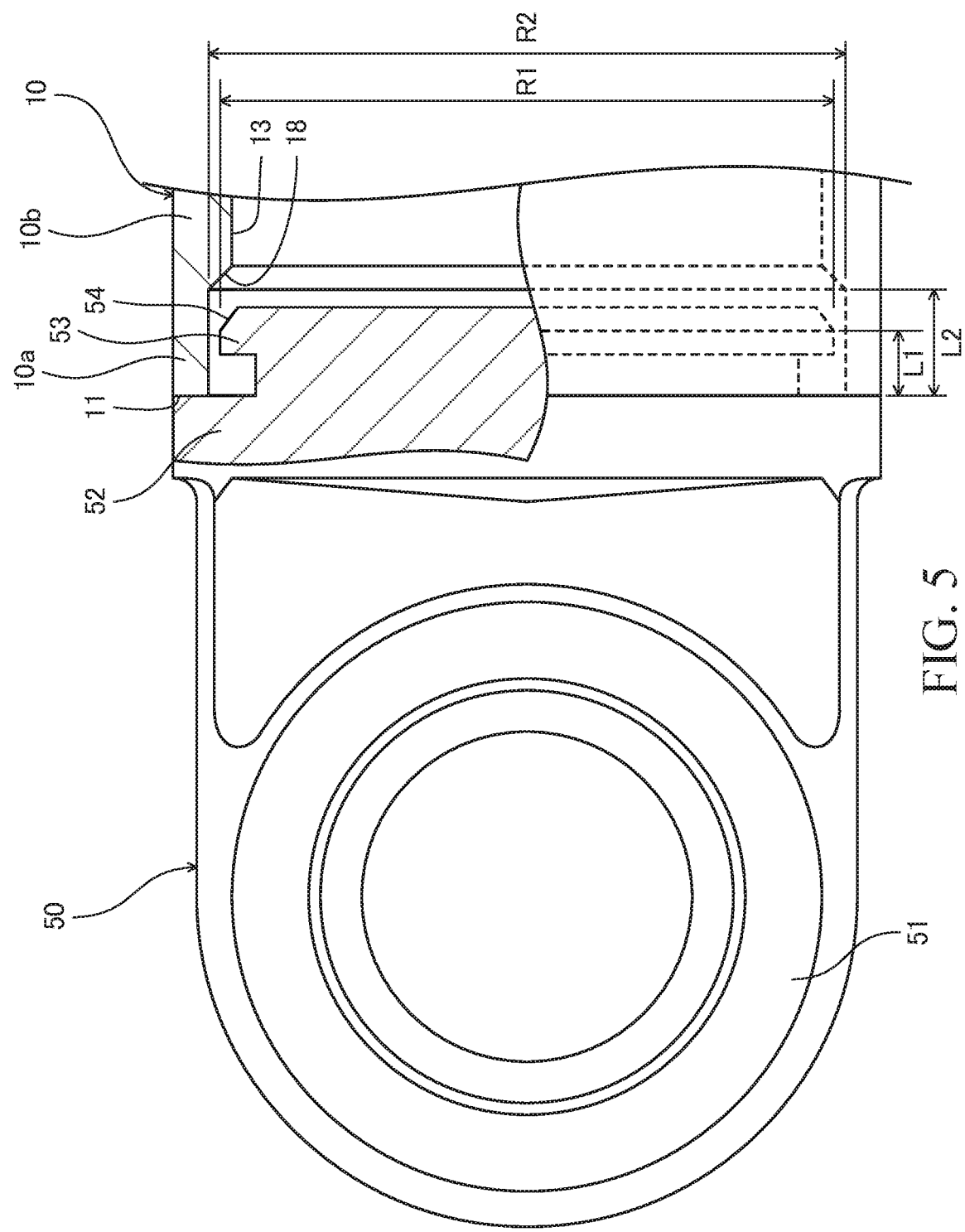
FIG. 5 is a partial sectional view for explaining a manufacturing method of a bonded body and shows a state where the cylinder bottom is made to abut against the cylinder tube.

In the manufacturing method of the bonded body 1, first, as shown in FIG. 5, the protrusion portion 53 of the cylinder bottom 50 is inserted into the hollow portion 13 of the cylinder tube 10, and the body portion 52 of the cylinder bottom 50 is made to abut against the end surface 11 of the cylinder tube 10. At this time, a burr is generated on the body portion 52 and the large-diameter portion 10*a* by a heat generated on the contact portion between the body portion 52 and the large-diameter portion 10*a*.

Since the dimension L1 is smaller than the dimension L2, a gap is formed between the chamfered portion 54 and the inclined portion 18 in a state where the body portion 52 abuts against the end surface 11. Moreover, since the outer diameter R1 is smaller than the inner diameter R2, a gap is formed between the outer peripheral surface of the protrusion portion 53 and the inner peripheral surface of the large-diameter portion 10*a*.

Subsequently, the cylinder tube 10 and the cylinder bottom 50 are relatively rotated. As a result, a friction heat is generated on contact surfaces between the end surface 11 of the cylinder tube 10 and the body portion 52 of the cylinder bottom 50, and the body portion 52 and the large-diameter portion 10*a* are heated. At this time, a burr, which is generated on the body portion 52 and the large-diameter portion 10*a*, grows.

Since the gap is formed between the outer peripheral surface of the protrusion portion 53 and the inner peripheral surface of the large-diameter portion 10*a*, even if the cylinder tube 10 and the cylinder bottom 50 are relatively rotated, the friction heat is not generated on the outer peripheral surface of the protrusion portion 53 and the inner peripheral surface of the large-diameter portion 10*a*.

Figure 6:
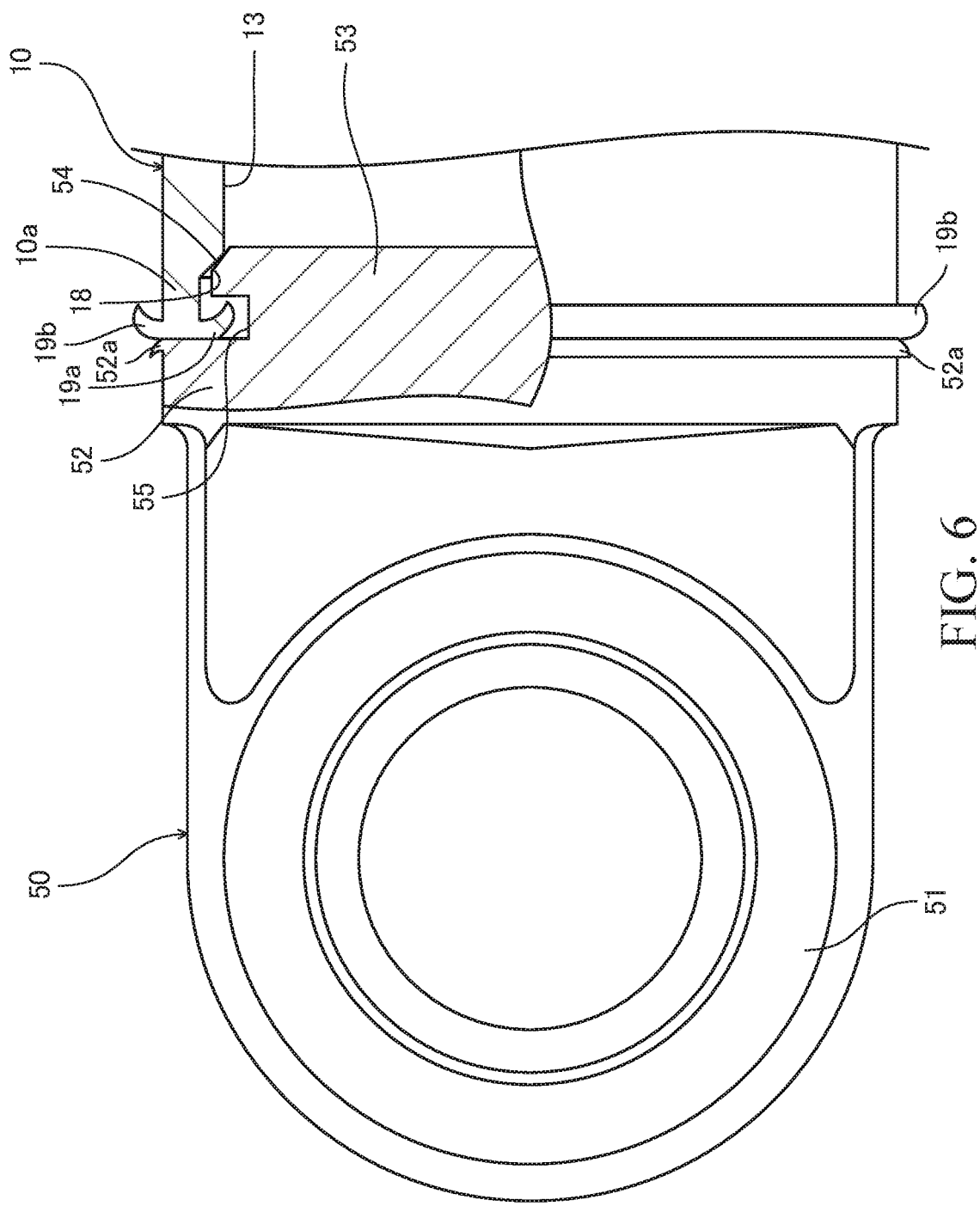
FIG. 6 is a partial sectional view for explaining the manufacturing method of the bonded body and shows a state where the cylinder bottom and the cylinder tube are pressed to each other.

Subsequently, the relative rotation of the cylinder tube 10 and the cylinder bottom 50 is stopped, and the cylinder tube 10 and the cylinder bottom 50 are pressed to each other until the inclined portion 18 of the cylinder tube 10 and the chamfered portion 54 are brought into contact with each other (see FIG. 6). At this time, a part of the large-diameter portion 10*a* of the cylinder tube 10 is pushed out to the inner side and the outer side of the cylinder tube 10. Therefore, the burr, which has been already formed on the large-diameter portion 10*a*, further grows (see the inner burr 19*a* and an outer burr 19*b*). Moreover, the part of the body portion 52 of the cylinder bottom 50 is pushed out to the outer side. Therefore, the burr, which has been already formed on the body portion 52, further grows. (see the outer burr 52*a*).

The inner burr 19*a* is guided to the dent 55 of the protrusion portion 53. Therefore, the inner burr 19*a* can be prevented from being sandwiched between the inclined portion 18 and the chamfered portion 54 when the cylinder tube 10 and the cylinder bottom 50 are pressed to each other.

The inclined portion 18 and the chamfered portion 54 are formed with inclination to the radial direction of the opening of the hollow portion 13 (the radial direction of the cylinder tube 10). Thus, the cylinder bottom 50 is guided to the desired position in the radial direction with respect to the cylinder tube 10 by the contact between the inclined portion 18 and the chamfered portion 54. Therefore, a shift between the cylinder tube 10 and the cylinder bottom 50 can be prevented.

The cylinder tube 10 and the cylinder bottom 50 are bonded by cooling the large-diameter portion 10*a* and the body portion 52. After that, by removing the outer burrs 19*b* and 52*a* by cutting or the like, the bonded body 1 is completed.

In the description above, the inner peripheral surface of the hollow portion 13 and the outer peripheral surface of the protrusion portion 53 have the inclined portion 18 and the chamfered portion 54 inclined to the radial direction, respectively, but this embodiment is not limited to that.

Figure 7:
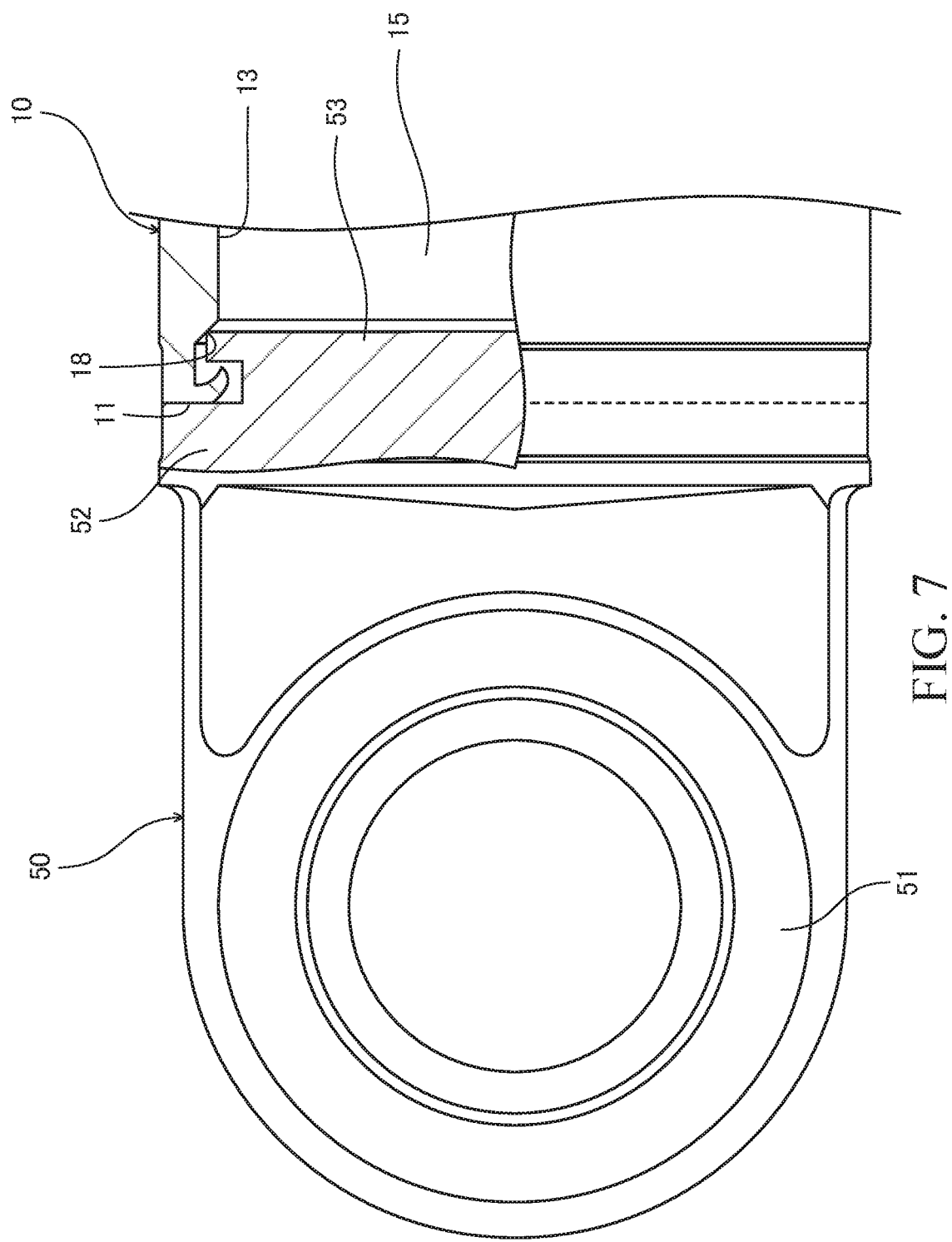
FIG. 7 is a partial sectional view of a hydraulic cylinder according to another embodiment of the present invention and shows a form in which an inclination portion is formed only on an inner peripheral surface of a hollow portion.

FIG. 7 is a partial sectional view of the bonded body 1 according to another embodiment. In the form shown in FIG. 7, the inclined portion 18 is formed on the inner peripheral surface of the cylinder tube 10, but a chamfered portion (inclined portion) 54 as shown in FIG. 2 is not formed on the outer peripheral surface of the protrusion portion 53. In this form, too, the cylinder bottom 50 is guided to the desired position in the radial direction with respect to the cylinder tube 10 by the contact between the inclined portion 18 and the outer peripheral surface of the protrusion portion 53 during bonding. Therefore, a shift between the cylinder tube 10 and the cylinder bottom 50 can be prevented.

Figure 8:
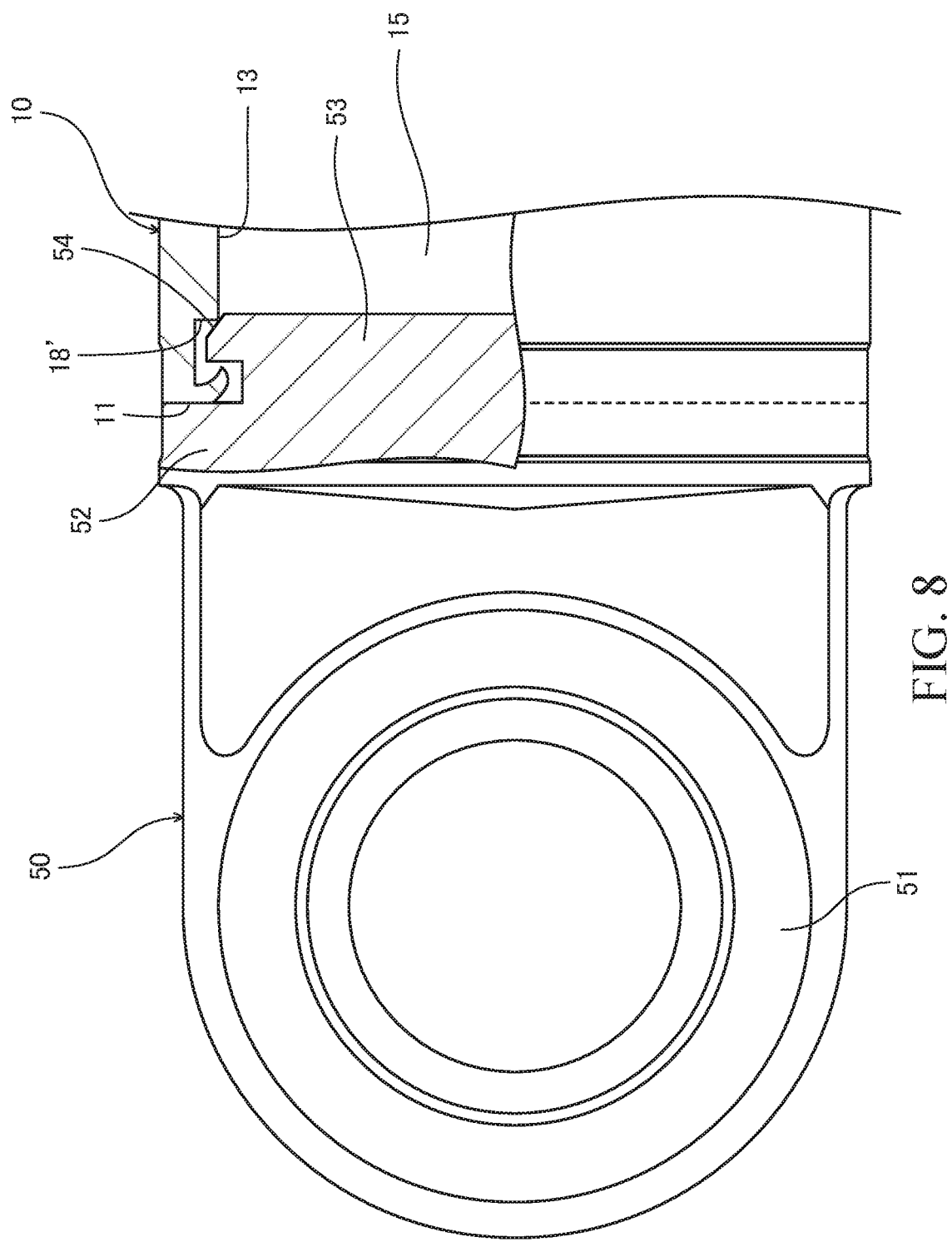
FIG. 8 is a partial sectional view of the hydraulic cylinder according to another embodiment of the present invention and shows a form in which the inclination portion is formed only on an outer peripheral surface of a protruding portion.

FIG. 8 is a partial sectional view of the bonded body 1 according to still another embodiment. In the form shown in FIG. 8, the chamfered portion (inclined portion) 54 is formed on the outer peripheral surface of the protrusion portion 53, but on the inner peripheral surface of the cylinder tube 10, a stepped portion 18' is formed instead of the inclined portion 18 as shown in FIG. 2. In this form, too, the cylinder bottom 50 is guided to the desired position in the radial direction with respect to the cylinder tube 10 by the contact between the stepped portion 18' and the chamfered portion 54 during bonding. Therefore, a shift between the cylinder tube 10 and the cylinder bottom 50 can be prevented.

As described above, in this embodiment, it is only necessary that at least one surface of the inner peripheral surface of the hollow portion 13 and the outer peripheral surface of the protrusion portion 53 has the inclined portion 18, 54 inclined to the radial direction of the opening of the hollow portion 13, and the other surface of the inner peripheral surface of the hollow portion 13 and the outer peripheral surface of the protrusion portion 53 is in contact with the inclined portion 18, 54.

If both the inner peripheral surface of the hollow portion 13 and the outer peripheral surface of the protrusion portion 53 have the inclined portion, the surface and the surface are brought into contact with each other. Thus, as compared with the case where only one surface of them has the inclined portion, accuracy of centering is improved, and the shift between the cylinder tube 10 and the cylinder bottom 50 can be further prevented.

If only one surface of the inner peripheral surface of the hollow portion 13 and the outer peripheral surface of the protrusion portion 53 has the inclined portion, there is no need to form the inclined portion on the other surface. Thus, as compared with the case where the both have the inclined portions, the cylinder tube 10 or the cylinder bottom 50 can be formed easily.

Hereinafter, the constitutions, actions, and effects of the embodiment of the present invention will be described collectively.

This embodiment relates to the bonded body 1 formed by the frictional pressure-contact. The bonded body 1 includes the first member 10 having the end surface 11 and the hollow portion 13 opened in the end surface 11 and the second member 50 having the body portion 52 bonded to the end surface 11 and the protrusion portion 53 protruding from the body portion 52, the protrusion portion 53 being accommodated in the hollow portion 13. The bonded body 1 is characterized that the inner peripheral surface of the hollow portion 13 has the inclined portion 18 inclined to the radial direction of the opening of the hollow portion 13, and the outer peripheral surface of the protrusion portion 53 is in contact with the inclined portion 18. Alternatively, the bonded body 1 is characterized that the outer peripheral surface of the protrusion portion 53 has the chamfered portion 54 inclined to the radial direction of the opening of the hollow portion 13, and the inner peripheral surface of the hollow portion 13 is in contact with the chamfered portion 54.

In this constitution, the inner peripheral surface of the hollow portion 13 has the inclined portion 18, and the outer peripheral surface of the protrusion portion 53 is in contact with the inclined portion 18. Alternatively, the outer peripheral surface of the protrusion portion 53 has the chamfered portion 54, and the inner peripheral surface of the hollow portion 13 is in contact with the chamfered portion 54. Thus, when the protrusion portion 53 is inserted into the hollow portion 13 so as to bond the first member 10 and the second member 50 to each other, the second member 50 is guided to the desired position in the radial direction with respect to the first member 10 by the contact between the inner peripheral surface of the hollow portion 13 and the outer peripheral surface of the protrusion portion 53. Therefore, the shift between the first member 10 and the second member 50 during bonding can be prevented.

Moreover, in this embodiment, in the bonded body 1, the second member 50 further has the dent 55 on the outer peripheral surface of the protrusion portion 53, and the dent 55 is located between the contact portion between the inner peripheral surface of the hollow portion 13 and the outer peripheral surface of the protrusion portion 53 and the body portion 52.

In this constitution, since the dent 55 on the outer peripheral surface of the protrusion portion 53 is located between the body portion 52 and the contact portion, the inner burr 19a that is generated by plastic fluidity in the frictional pressure-contact is guided to the dent 55. Therefore, the inner burr 19a can be prevented from being sandwiched between the inclined portion 18 and the chamfered portion 54 during bonding, and the shift between the first member 10 and the second member 50 can be prevented more reliably.

Moreover, in this embodiment, the bonded body 1 is characterized in that the inclined portion 18 is formed annularly, and the outer peripheral surface of the protrusion portion 53 is in contact with the inclined portion 18 over the entire circumference. Alternatively, in the bonded body 1, the chamfered portion 54 is formed annularly, and the inner peripheral surface of the hollow portion 13 is in contact with the chamfered portion 54 over the entire circumference.

In this constitution, the outer peripheral surface of the protrusion portion 53 is in contact with the inclined portion 18 over the entire circumference. Alternatively, the inner peripheral surface of the hollow portion 13 is in contact with the chamfered portion 54 over the entire circumference. Thus, the gap 56 between the body portion 52 and the contact portion is formed as a sealed space. Therefore, the foreign substance in the gap 56 can be prevented from flowing out to the anti-rod side chamber 15.

Moreover, in this embodiment, the hydraulic cylinder 100 includes the aforementioned bonded body 1, the first member 10 is the cylinder tube 10, and the second member 50 is the cylinder bottom 50 closing the opening of the hollow portion 13.

In this constitution, the first member 10 is the cylinder tube 10 and the second member 50 is the cylinder bottom 50 and thus, when the cylinder tube 10 and the cylinder bottom 50 are to be bonded together, the cylinder bottom 50 is guided to the desired position in the radial direction with respect to the cylinder tube 10. Therefore, a shift between the cylinder tube 10 and the cylinder bottom 50 during bonding can be prevented.

Moreover, this embodiment relates to the method of manufacturing the bonded body 1 formed by bonding the first member 10 having the hollow portion 13 opened in the end surface 11 and the second member 50 having the protrusion portion 53 protruding from the body portion 52 by frictional pressure-contact. The manufacturing method of the bonded body 1 includes a process of inserting the protrusion portion 53 into the hollow portion 13 and of causing the body portion 52 of the second member 50 to abut against the end surface 11 of the first member 10 and a process of relatively rotating the first member 10 and the second member 50 so as to generate heat on the end surface 11 and the body portion 52. This manufacturing method further includes a step of pressing the first member 10 and the second member 50 to each other until the inclined portion 18 formed on the inner peripheral surface of the hollow portion 13 and inclined to the radial direction of the opening of the hollow portion 13 is brought into contact with the outer peripheral surface of the protrusion portion 53 or a process of pressing the first member 10 and the second member 50 to each other until the chamfered portion 54 formed on the outer peripheral surface of the protrusion portion 53 and inclined to the radial direction of the opening of the hollow portion 13 is brought into contact with the inner peripheral surface of the hollow portion 13.

In this constitution, when the first member 10 and the second member 50 are to be bonded together by the frictional pressure-contact, the first member 10 and the second member 50 are pressed to each other until the outer peripheral surface of the protrusion portion 53 is brought into contact with the inclined portion 18 or until the inner peripheral surface of the hollow portion 13 is brought into contact with the chamfered portion 54. Thus, when the first member 10 and the second member 50 are to be bonded together, the second member 50 is guided to the desired position in the radial direction with respect to the first member 10. Therefore, a shift between the first member 10 and the second member 50 during bonding can be prevented.

Embodiments of this invention were described above, but the above embodiments are merely examples of applications of this invention, and the technical scope of this invention is not limited to the specific constitutions of the above embodiments.

Figure 9:
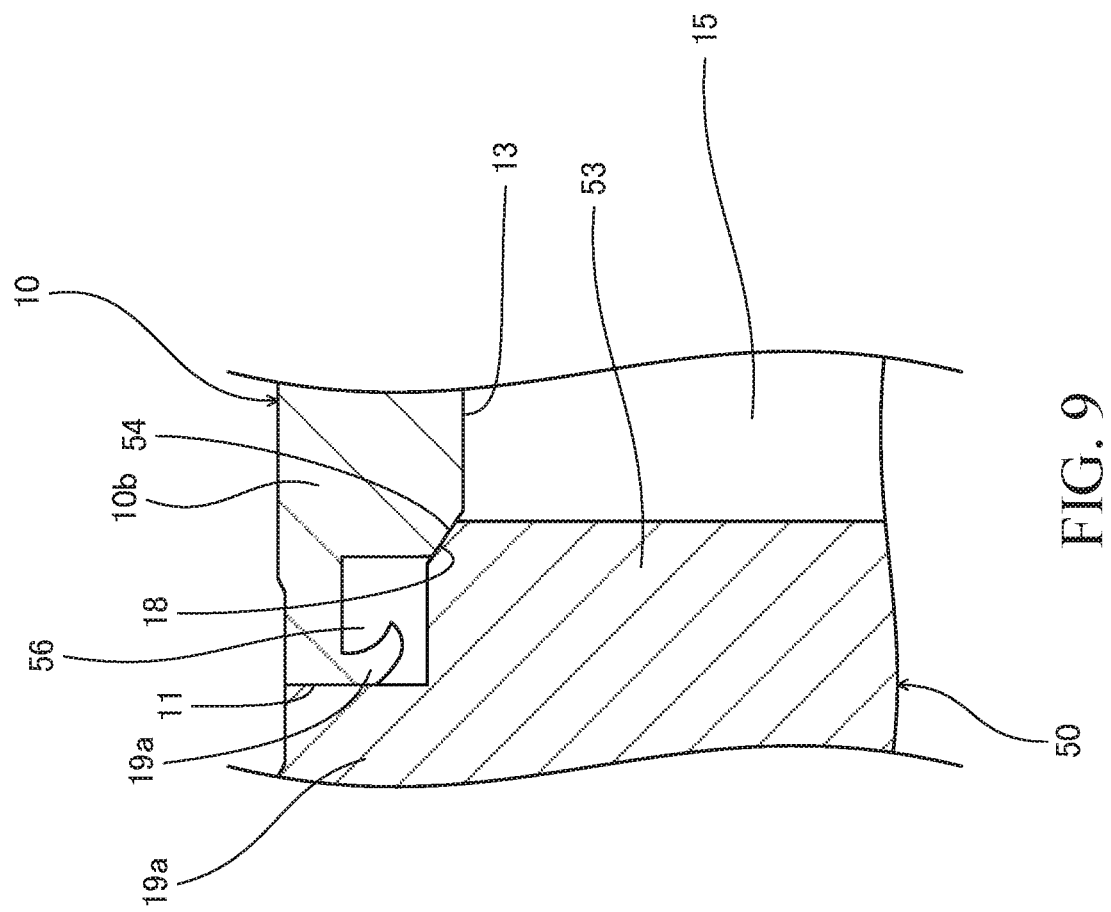
FIG. 9 is a partial sectional view of the hydraulic cylinder according to another embodiment of the present invention and shows a form in which a dent is not formed on the outer peripheral surface of the protruding portion.

For example, the dent 55 does not have to be provided in the outer peripheral portion of the protrusion portion 53. As shown in FIG. 9, the inner peripheral surface of the hollow portion 13 and the outer peripheral surface of the protrusion portion 53 may be brought into contact with each other by increasing the thickness of the small-diameter portion 10b so as to overlap the protrusion portion 53 of the cylinder bottom 50. Since the dent does not have to be made in the protrusion portion 53, a machining cost of the cylinder bottom 50 can be reduced.

The inclined portion 18 and the chamfered portion 54 do not have to be in contact over the entire circumference. A part of the inclined portion 18 and a part of the chamfered portion 54 may be in contact. A part of the inclined portion 18 and a part of the chamfered portion 54 do not have to be formed annularly.

This application claims priority based on Japanese Patent Application No. 2015-197869 filed with the Japan Patent Office on Oct. 5, 2015, the entire contents of which are incorporated into this specification.

The invention claimed is:

1. A fluid pressure cylinder including a bonded body formed by frictional pressure-contact, comprising:
   a cylinder tube including an end surface and a hollow portion with an opening in the end surface; and
   a cylinder bottom including a body portion bonded to the end surface and a protrusion portion protruding from the body portion, the protrusion portion being accommodated in the hollow portion, the cylinder bottom being configured to close the opening of the hollow portion, wherein
   the hollow portion includes a large-diameter portion having the end surface, and a small-diameter portion provided continuously to the large-diameter portion, the small-diameter portion having an inner diameter smaller than an inner diameter of the large-diameter portion, the large-diameter portion is provided to be spaced from the protrusion portion in a radial direction of the opening to form an annular gap between an inner peripheral surface of the large-diameter portion and the outer peripheral surface of the protrusion portion,
   at least one of an inner peripheral surface of the small-diameter portion or an outer peripheral surface of the protrusion portion includes an inclined portion inclined to the radial direction, while another of the at least one of the inner peripheral surface of the small-diameter portion or the outer peripheral surface of the protrusion portion is in contact with the inclined portion to seal the annular gap, and
   the cylinder bottom further includes a dent in the outer peripheral surface of the protrusion portion, and the dent is located between a contact portion between the inner peripheral surface of the small-diameter portion and the outer peripheral surface of the protrusion portion and the body portion.

* * * * *